United States Patent
Cheng et al.

(10) Patent No.: US 11,648,662 B2
(45) Date of Patent: May 16, 2023

(54) SPEED REDUCER AND ROBOT

(71) Applicant: GREE ELECTRIC APPLIANCES, INC. OF ZHUHAI, Zhuhai (CN)

(72) Inventors: Zhongfu Cheng, Zhuhai (CN); Chengbao Zhong, Zhuhai (CN); Zhong Cui, Zhuhai (CN); Zhenzhen Tian, Zhuhai (CN); Jiajia Gu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 4 days.

(21) Appl. No.: 17/198,507

(22) Filed: Mar. 11, 2021

(65) Prior Publication Data

US 2021/0197365 A1  Jul. 1, 2021

Related U.S. Application Data

(63) Continuation of application No. PCT/CN2018/122714, filed on Dec. 21, 2018.

(30) Foreign Application Priority Data

Sep. 19, 2018  (CN) ......................... 201811092720.X

(51) Int. Cl.
  *B25J 9/10*  (2006.01)
(52) U.S. Cl.
  CPC ............. *B25J 9/1025* (2013.01); *B25J 9/108* (2013.01)
(58) Field of Classification Search
  CPC ....... B25J 9/1025; B25J 9/108; F16H 49/001; F16H 2049/008; F16H 55/0833
  See application file for complete search history.

(56) References Cited

U.S. PATENT DOCUMENTS

| | | | |
|---|---|---|---|
| 11,092,225 B2 * | 8/2021 | Mendel | ................. F16H 49/001 |
| 2008/0110287 A1 * | 5/2008 | Schonlau | ............... B25J 9/1025 74/457 |

FOREIGN PATENT DOCUMENTS

| | | |
|---|---|---|
| CN | 2351616 Y | 12/1999 |
| CN | 1424520 A | 6/2003 |
| CN | 102678881 A | 9/2012 |
| CN | 202732859 U | 2/2013 |

(Continued)

OTHER PUBLICATIONS

Extended European Search Report issued in counterpart European Patent Application No. 18934148.0, dated Jul. 15, 2021.

(Continued)

*Primary Examiner* — Zakaria Elahmadi
(74) *Attorney, Agent, or Firm* — Westbridge IP LLC

(57) ABSTRACT

A speed reducer and a robot are disclosed. The speed reducer includes a rigid wheel, a flexible wheel and a flexible bearing; the rigid wheel is provided with a first fitting position and an inner wheel tooth set; the outer peripheral surface of a peripheral wall of the flexible wheel is provided with an outer wheel tooth set; in the axial direction of the rigid wheel, the tooth top of the outer wheel tooth set is provided with a first length, and the tooth root of the outer wheel tooth set is provided with a second length; the tooth top of the inner wheel tooth set is provided with a third length; the flexible bearing is provided with a fourth length; the second length and the third length are both greater than the first length, and the fourth length is greater than the second length.

14 Claims, 4 Drawing Sheets

(56) References Cited

FOREIGN PATENT DOCUMENTS

| | | |
|---|---|---|
| CN | 103649586 A | 3/2014 |
| CN | 105605197 A | 5/2016 |
| CN | 106224487 A | 12/2016 |
| CN | 206072245 U | 4/2017 |
| CN | 206246608 U | 6/2017 |
| CN | 207122561 U | 3/2018 |
| CN | 107893840 A | 4/2018 |
| CN | 207715678 U | 8/2018 |
| CN | 109027180 A | 12/2018 |
| CN | 208778633 U | 4/2019 |
| DE | 102016220916 A1 * | 10/2017 |
| DE | 102016220916 A1 | 10/2017 |
| DE | 102016218927 A1 | 11/2017 |
| JP | 2015209931 A | 11/2015 |
| SU | 894267 A1 | 12/1981 |
| WO | 2019170198 A1 | 9/2019 |

OTHER PUBLICATIONS

Office Action issued in counterpart European Patent Application No. 18934148.0, dated Mar. 28, 2022.
International Search Report in corresponding PCT Application No. PCT/CN2018/122714, dated Jun. 19, 2019.
Written Opinion in corresponding PCT Application No. PCT/CN2018/122714, dated Jun. 19, 2019.

* cited by examiner

SPEED REDUCER AND ROBOT

CROSS-REFERENCE TO RELATED APPLICATIONS

The present application is a continuation of International Application No. PCT/CN2018/122714 filed on Dec. 21, 2018, which claims priority to Chinese patent application No. 201811092720.X filed on Sep. 19, 2018. Both applications are incorporated herein by reference in their entireties.

TECHNICAL FIELD

The present application relates to the technical field of deceleration device, in particular to a speed reducer and a robot applying the speed reducer.

BACKGROUND

A harmonic gear reducer is a speed reducer composed of a rigid wheel, a flexible wheel and a harmonic generator that radially deforms the flexible wheel. Harmonic gear reducer has advantages of high precision, high carrying capacity, large transmission ratio, small size, light weight and the like, and the harmonic gear reducer is widely used in field of electronics industry, aerospace industry, robot industry, machine tool industry, other industries and the like. The harmonic generator of the harmonic gear reducer includes a flexible bearing and a cam. The cam is inserted into the flexible bearing, such that the flexible bearing deforms and has an oval outer surface. The flexible bearing is installed in a fitting position enclosed by a peripheral wall of the flexible wheel, so that the peripheral wall of the flexible wheel deforms according to a contour of the flexible bearing, and the outer wheel tooth set on an outer circumference of the flexible wheel is arranged in an oval shape.

In order to meet a lightweight requirements, traditional harmonic gear reducers usually use flexible bearings with smaller sizes and shorter axial lengths, and following is a technical problem that an axial length of the flexible bearing is too short, such that the expansion and deformation of the peripheral wall along the axial direction will be incomplete, as a result, a meshing contact between the outer wheel tooth set and the inner wheel tooth set is insufficient, resulting in transmission errors; in addition, the axial length of a flexible bearing is too short, it is difficult to ensure an installation coaxiality between the flexible bearing having short axial length and the flexible wheel, the expansion and deformation of the peripheral wall along the radial direction are uneven, and a stress state of the flexible bearing is unstable, such that the transmission errors are generated and a service life of the flexible bearing is shortened.

SUMMARY

A first purpose of the present application is to provide a speed reducer with less transmission errors and longer service life.

A second purpose of the present application is to provide a robot with less transmission errors and longer service life.

The reducer provided by the first purpose of the present application includes a rigid wheel, a flexible wheel and a flexible bearing. The rigid wheel is provided with a first fitting position in a middle of the rigid wheel. An inner wheel tooth set is disposed on an inner side of the rigid wheel, and the inner wheel tooth set faces the first fitting position. The flexible wheel has a peripheral wall. The peripheral wall encloses a second fitting position. An outer peripheral surface is disposed on an outer side of the peripheral wall. An outer wheel tooth set is disposed on the outer peripheral surface of the peripheral wall. An inner peripheral surface is disposed on an inner side along a radial direction of the peripheral wall, and the inner peripheral surface faces the second fitting position. The flexible bearing is installed in the second fitting position and abuts against the inner peripheral surface. The flexible wheel is installed in the first fitting position. The outer wheel tooth set engages with the inner wheel tooth set. Along an axial direction of the rigid wheel, a length of a tooth top of the outer wheel tooth set is a first length, a length of a tooth root of the outer wheel tooth set is a second length, a tooth top of the inner wheel tooth set is a third length, and a length of the flexible bearing is a fourth length. Both the second length and the third length are greater than the first length, and the fourth length is greater than the second length.

It can be seen from the above solution, since the fourth length of the flexible bearing is greater than the second length of the tooth root of the outer wheel tooth set, a part, on which the outer wheel tooth set is located, of the peripheral wall is fully expanded under contact with the flexible bearing. In addition, since the flexible bearing has a greater length, the installation coaxiality of the flexible bearing and the peripheral wall is guaranteed, such that the peripheral wall expand and deform uniformly along a peripheral direction, and a meshing and contact between the outer wheel tooth set and the inner wheel tooth set are more sufficient, thereby effectively reducing transmission errors and prolonging the service life of the flexible bearing.

In one of the embodiments, the second length is greater than the third length.

It can be seen that this solution can ensure that the meshing between the outer gear set and the inner gear set is sufficient.

Further, along the axial direction of the rigid wheel, the peripheral wall has a fifth length. The fourth length is greater than 0.3 times the fifth length and less than 0.7 times the fifth length.

In one of the embodiments, along the axial direction of the rigid wheel, the peripheral wall has a fifth length. The fourth length is greater than 0.5 times the fifth length and less than 0.6 times the fifth length.

It can be seen that the greater a proportion of the fourth length of the flexible bearing along the axial direction relative to the fifth length of the peripheral wall is, the more uniform the deformation of the deformation of the peripheral wall caused by the flexible bearing and the flexible bearing itself will be.

In one of the embodiments, the fourth length is greater than 0.2 times the diameter of the inner peripheral surface.

In one of the embodiments, the fourth length is greater than 0.3 times the diameter of the inner peripheral surface.

It can be seen that, in a case where the proportion of the fourth length of the flexible bearing along the axial direction relative to the diameter of the inner peripheral surface is increased, a possibility of the flexible bearing swinging relative to the peripheral wall is reduced, a maximum amount of swing that can be generated is decreased, the transmission is more stable and the transmission error is less.

In one of the embodiments, along an axial direction of the flexible wheel, the outer wheel tooth set is disposed at a first end of the peripheral wall. The inner diameter of the peripheral wall gradually decreases from a middle part of the peripheral wall to a second end of the peripheral wall.

In one of the embodiments, along an axial direction of the flexible wheel, the outer wheel tooth set is disposed at a first end of the peripheral wall. The inner diameter of the peripheral wall gradually increases from a middle part of the peripheral wall to a second end of the peripheral wall. Further, on a radial section of the rigid wheel, the inner peripheral surface is parallel to an axis of the rigid wheel.

It can be seen that the inner peripheral surface having a cylindrical shape can improve a uniformity of the deformation of the peripheral wall.

In one of the embodiments, along the radial direction of the rigid wheel, a first end surface of the flexible bearing is disposed on a first plane, and a second end surface of the flexible bearing is disposed on a second plane. The outer wheel tooth set is integrally located between the first plane and the second plane.

It can be seen that the deformation of the peripheral wall caused by the flexible bearing can be completely reflected on the deformation of the outer wheel tooth set, so that the meshing between the outer wheel tooth set and the inner wheel tooth set is more sufficient.

In one of the embodiments, the speed reducer further includes a harmonic generator. The harmonic generator includes a rotating drive part and a cam connected to an output end of the rotating drive part. The flexible bearing is sleeved on the cam.

In one of the embodiments, along the axial direction of the flexible wheel, the outer wheel tooth set is disposed at a first end of the peripheral wall, and a flange is disposed at a second end of the peripheral wall.

In one of the embodiments, the rigid wheel and the flexible wheel are connected by a rigid bearing.

The robot provided by the second purpose of the present application includes a first part and a second part rotating relative to the first part. The robot further includes the speed reducer as described above. The speed reducer is connected between the first part and the second part.

As can be seen from the above solution, there is a joint between the first part and the second part, and the robot adopts the speed reducer as described above at the joint to make the robot have the characteristics of stable work, accurate positioning, long service life and the like.

The following further describes the present application with reference to the accompanying drawings and the embodiments.

DETAILED DESCRIPTION

Figure 1:
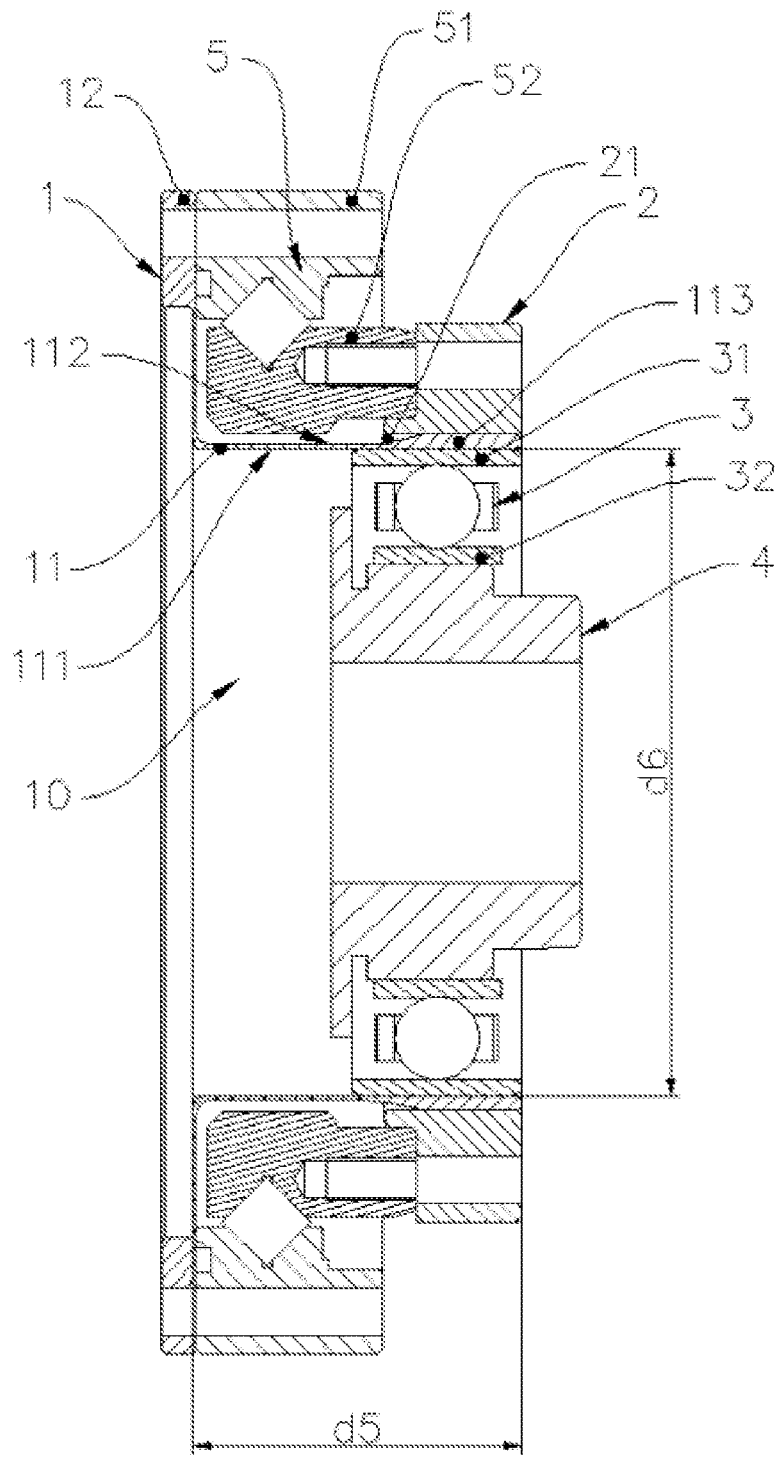
FIG. 1 is a cross-sectional view of a speed reducer according to a first embodiment of the present application.

Refer to FIG. 1, which is a cross-sectional view of a speed reducer according to a first embodiment of the present application. The speed reducer provided in the present application is a harmonic reducer applied to a joint of a robot. The robot may be an industrial robot arm. The industrial robot arm has a first arm (a first part) and a second arm (a second part). There is a joint between the first arm and the second arm. The harmonic reducer is disposed at the joint. A relative rotation between the first arm and the second arm is realized by the harmonic reducer.

The harmonic reducer includes a flexible wheel 1, a rigid wheel 2, a flexible bearing 3, a rigid bearing 5 and a harmonic generator. The flexible wheel 1 is in a cylindrical shape. The flexible wheel 1 has a peripheral wall 11 having a cylindrical shape. The peripheral wall 11 encloses a second fitting position 10, the second fitting position 10 penetrates two ends of the flexible wheel 1 along the axial direction. An inner side of the peripheral wall 11 is an inner peripheral surface 111 facing the second fitting position 10. On a radial section of the rigid wheel 2, the inner peripheral surface 111 is parallel to an axis of the rigid wheel 2. An outer side of the peripheral wall 11 is an outer peripheral surface 112 corresponding to the inner peripheral surface 111. Along the axial direction of the flexible wheel 1, an outer wheel tooth set 113 is disposed on a first end of the outer peripheral surface 112. A plurality of outer wheel teeth of the outer wheel tooth set 113 are arranged around an outer circumference of the peripheral wall 11. Along the axial direction of the flexible wheel 1, a flange 12 is connected to a second end of the peripheral wall 11. The flange 12 surrounds the peripheral wall 11. Optionally, the peripheral wall 11 is provided with a plurality of through holes penetrating the peripheral wall 11. The plurality of through holes are uniformly arranged along a circumferential direction of the peripheral wall 11.

The rigid wheel 2 has an annular shape. The rigid wheel 2 encloses a first fitting position. The first fitting position penetrates two ends of the rigid wheel 2 along the axial direction of the rigid wheel 2. An inner wheel tooth set 21 facing the first fitting position is disposed on the inner side of the rigid wheel 2.

The flexible wheel 1 is rotatably connected to the rigid wheel 2 by a rigid bearing 5. The rigid bearing 5 includes a rigid outer ring 51, a rigid inner ring 52 and rollers arranged between the rigid outer ring 51 and the rigid inner ring 52. The rigid outer ring 51 is fixedly connected to the flange 12 of the flexible wheel 1 by bolts. The rigid inner ring 52 is fixedly connected to the rigid wheel 2 by bolts.

The harmonic generator includes a rotating drive part and a cam 4. The cam 4 is connected to an output end of the rotating drive part. The rotating drive part is a motor. The cam 4 is connected to an output shaft of the motor through a self-aligning coupling. The flexible bearing 3 is sleeved on the cam 4.

The flexible bearing 3 includes a flexible outer ring 31, a flexible inner ring 32 and rollers arranged between the flexible outer ring 31 and the flexible inner ring 32. Since the flexible bearing 3 has an ability to deform, the flexible bearing 3 can deform according to an outer contour of the cam 4 after being sleeved on the cam 4. Therefore, the flexible bearing 3 has an oval outer contour after the flexible bearing 3 is sleeved on the cam 4. The flexible bearing 3 is disposed into the second fitting position 10. The flexible bearing 3 is in transitional fit with the peripheral wall 11. The outer peripheral surface of the flexible outer ring 31 abuts against the inner peripheral surface 111, such that the peripheral wall 11 is expanded and deformed.

Figure 2:
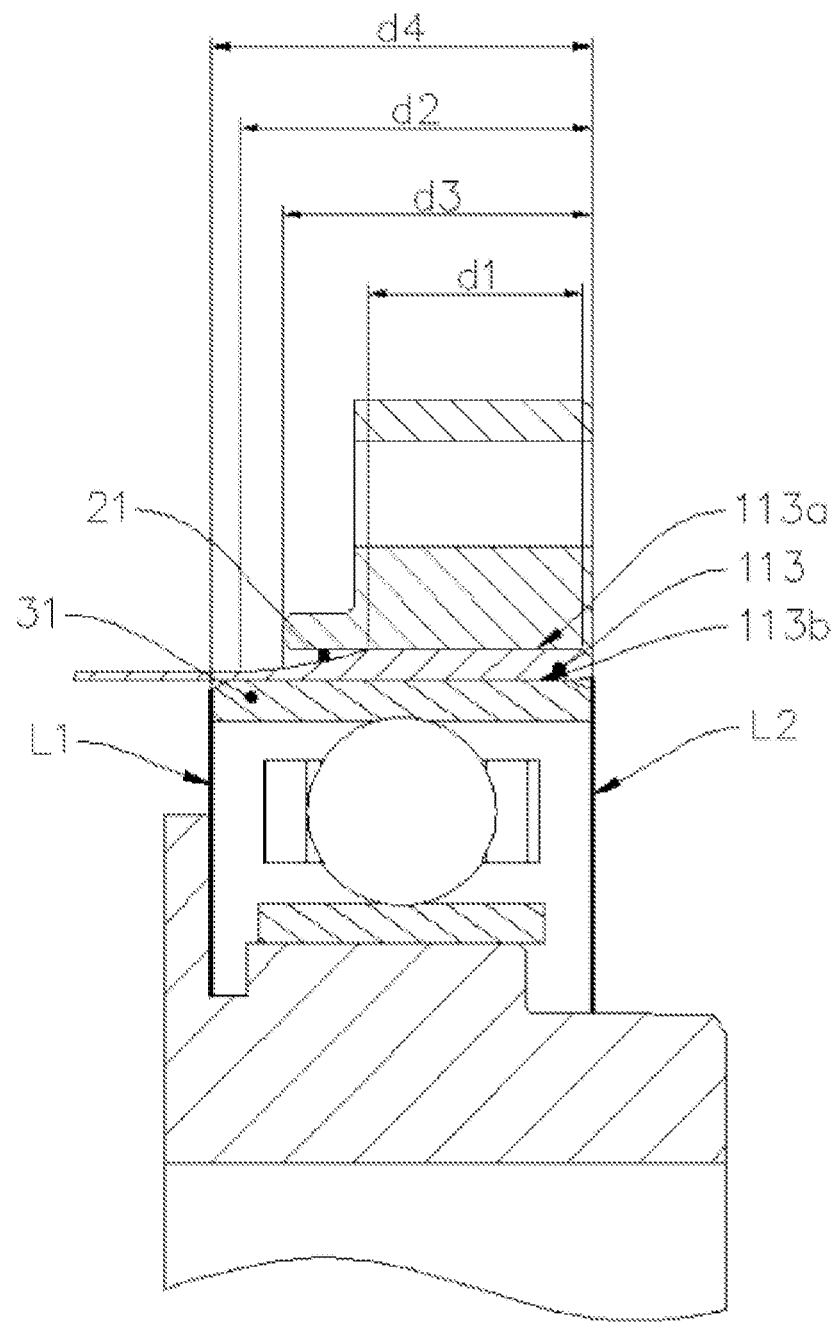
FIG. 2 is a partial cross-sectional view of the speed reducer according to the first embodiment of the present application.

Refer to FIG. 2, which is a partial cross-sectional view of the speed reducer according to the first embodiment of the present application. Along the axial direction of the rigid wheel 2, a tooth top 113a of the outer wheel tooth set 113 has a first length d1, a tooth root 113b of the outer wheel tooth set 113 has a second length d2, a tooth top of the inner wheel tooth set 21 has a third length d3, the flexible outer ring 31 has a fourth length d4, the peripheral wall 11 has a fifth length d5, and the inner peripheral surface 111 has a diameter d6. The second length d2 is greater than the third length d3. The second length d2 and the third length d3 are both greater than the first the length d1. The fourth length d4 is greater than the second length d2. In this embodiment, the fourth length d4 is greater than 0.3 times the diameter d6 of the inner peripheral surface 111. The fourth length d4 is greater than 0.5 times the fifth length d5 and less than 0.6 times the fifth length d5.

Along the axial direction of the rigid wheel 2, the flexible bearing 3 has a first end surface L1 and a second end surface L2. As shown from the cross-sectional view along the radial direction of the speed reducer, the outer wheel tooth set 113 is integrally located in the space between the first plane where the first end surface L1 of the flexible bearing 3 is located and the second plane where the second end surface L2 of the flexible bearing 3 is located. With the existence of the flexible bearing 3, the part of the peripheral wall 11 where the outer wheel tooth set is located is fully expanded, and the installation coaxiality of the flexible bearing 3 and the peripheral wall 11 is guaranteed due to that the flexible bearing 3 has a greater length, such that the peripheral wall 11 expand and deform uniformly along the circumferential direction and the meshing and contact between the outer wheel tooth set 113 and the inner wheel tooth set 21 are more sufficient, thereby effectively reducing transmission errors and extending the service life of the flexible bearing.

In a case that the proportion of the fourth length d4 relative to the fifth length d5 and the proportion of the fourth length d4 relative to the diameter d6 of the inner peripheral surface 111 are increased, the deformation of the peripheral wall 11 caused by the flexible bearing 3 and the deformation of the flexible bearing 3 itself are more uniform, the possibility of the flexible bearing 3 swinging relative to the peripheral wall 11 is reduced, the maximum amount of swing that can be generated is decreased, the transmission is more stable, and the transmission error is less. However, the proportion of the fourth length d4 relative to the fifth length d5 should not be too large, otherwise the installation difficulty of the flexible bearing 3 will increase.

Figure 3:
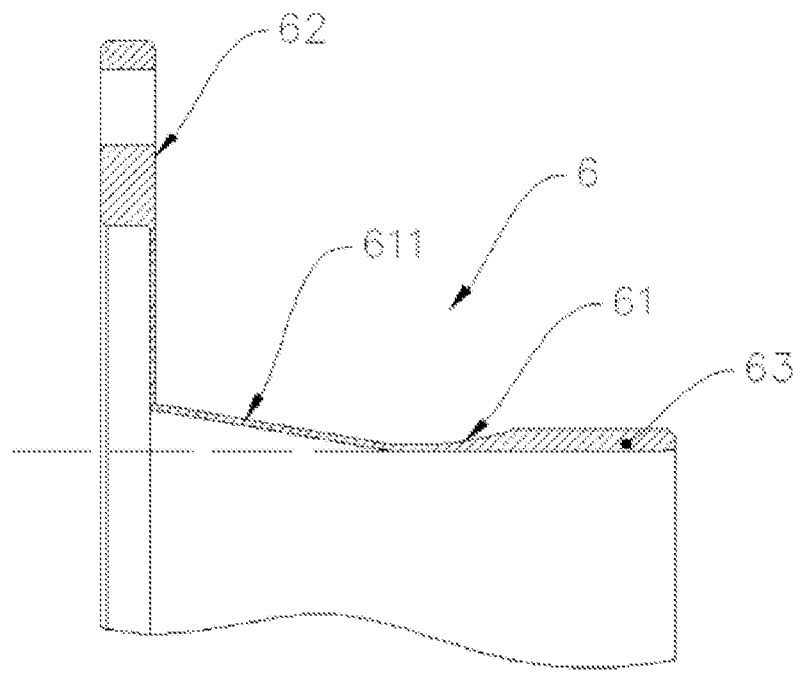
FIG. 3 is a partial cross-sectional view of a flexible wheel of a speed reducer according to a second embodiment of the present application.

Refer to FIG. 3, which is a partial cross-sectional view of a flexible wheel of a speed reducer according to a second embodiment of the present application. In this embodiment, an outer wheel tooth set 63 is disposed at a first end of the peripheral wall 61 of the flexible wheel 6 along the axial direction. A flange 62 is connected to a second end of the peripheral wall 61 along the axial direction. An inner diameter of the peripheral wall 61 gradually increases from a middle part of the peripheral wall 61 to the second end close to the flange 62, a total area of the peripheral wall 61 is increased, such that a deformability of the peripheral wall 61 is increased.

Figure 4:
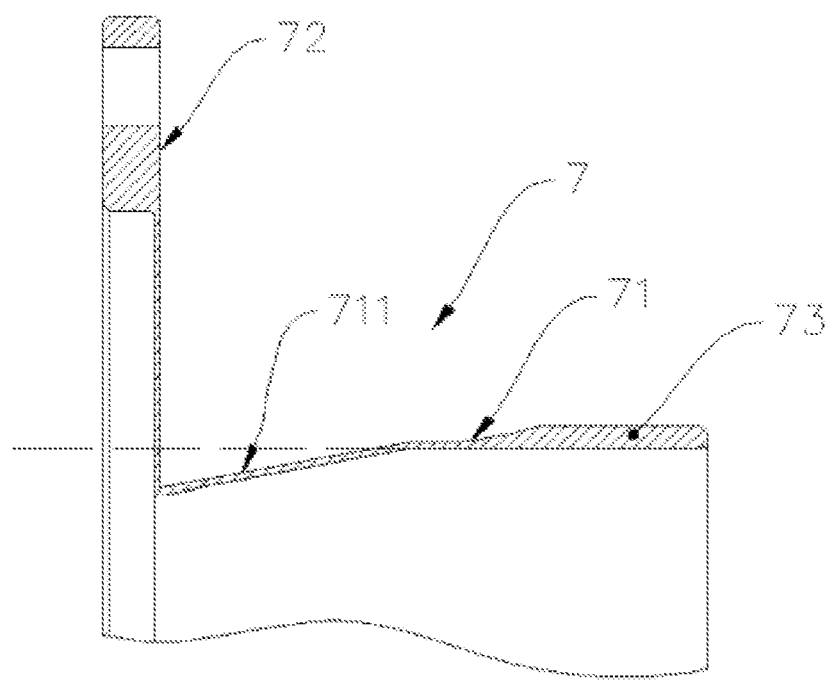
FIG. 4 is a partial cross-sectional view of a flexible wheel of a speed reducer according to a third embodiment of the present application.

Refer to FIG. 4, which is a partial cross-sectional view of a flexible wheel of a third embodiment of a speed reducer according to the present application. In this embodiment, an outer wheel tooth set 73 is disposed on a first end of the peripheral wall 71 of the flexible wheel 7 along the axial direction. A flange 72 is connected to a second end of the peripheral wall 71 along the axial direction. An inner diameter of the peripheral wall 71 gradually decreases from a middle part of the peripheral wall 71 to the second end close to the flange 72. After the flexible bearing is installed, the peripheral wall 71 with a gradually reduced inner diameter has a function of guiding and positioning, which further ensures a coaxiality of the connection between the flexible bearing and the peripheral wall 71, and further ensures a uniformity of the deformation of the peripheral wall 71.

Finally, it should be emphasized that the foregoing descriptions are merely specific implementation manners of the present application, and are not intended to limit the protection scope of the present application. Any variation or replacement readily figured out by a person skilled in the art within the technical scope disclosed in the present application shall fall within the protection scope of the present application.

What is claimed is:

1. A speed reducer, comprising a rigid wheel, a flexible wheel and a flexible bearing;
   wherein the rigid wheel is configured to enclose a first fitting position, and an inner wheel tooth set facing the first fitting position is disposed on an inner side of the rigid wheel along a radial direction of the rigid wheel;
   the flexible wheel comprises a peripheral wall, the peripheral wall encloses a second fitting position, an outer wheel tooth set is disposed on an outer peripheral surface of the peripheral wall, and an inner peripheral surface facing the second fitting position is disposed on the inner side of the flexible wheel in a radial direction of the flexible wheel;
   the flexible bearing is installed in the second fitting position and abuts against the inner peripheral surface of the peripheral wall, the flexible wheel is installed in the first fitting position, and the outer wheel tooth set is engaged with the inner wheel tooth set;
   along an axial direction of the rigid wheel, a length of a tooth top of the outer wheel tooth set is a first length, a length of a tooth root of the outer wheel tooth set is a second length, a length of a tooth top of the inner wheel tooth set is a third length, and a length of the flexible bearing is a fourth length;
   both the second length and the third length are greater than the first length, the second length is greater than the third length, and the fourth length is greater than the second length; and
   along an axial direction of the flexible wheel, the outer wheel tooth set is disposed at a first end of the peripheral wall, and an inner diameter of the peripheral wall gradually decreases from a middle part of the peripheral wall to a second end of the peripheral wall.

2. The speed reducer according to claim 1, wherein along the axial direction of the rigid wheel, a length of the peripheral wall is a fifth length; and
   the fourth length is greater than 0.3 times the fifth length and less than 0.7 times the fifth length.

3. The speed reducer according to claim 2, wherein the fourth length is greater than 0.5 times the fifth length and less than 0.6 times the fifth length.

4. The speed reducer according to claim 1, wherein the fourth length is greater than 0.2 times a diameter of the inner peripheral surface.

5. The speed reducer according to claim 4, wherein the fourth length is greater than 0.3 times the diameter of the inner peripheral surface.

6. The speed reducer according to claim 1, wherein on a radial section of the rigid wheel, the inner peripheral surface is parallel to an axis of the rigid wheel.

7. The speed reducer according to claim 1, wherein along the radial direction of the rigid wheel, a first end surface of the flexible bearing is located on a first plane, a second end surface of the flexible bearing is located on a second plane, and the outer wheel tooth set is located between the first plane and the second plane.

8. The speed reducer according to claim 1, wherein the speed reducer further comprises a harmonic generator, the harmonic generator comprises a rotating drive part and a cam connected to an output end of the rotating drive part; and the flexible bearing is sleeved on the cam.

9. The speed reducer according to claim 1, wherein along an axial direction of the flexible wheel, the outer wheel tooth set is disposed at a first end of the peripheral wall, and a flange is disposed at a second end of the peripheral wall.

10. The speed reducer according to claim 1, wherein the rigid wheel and the flexible wheel are connected by a rigid bearing.

11. A robot, comprising a first part, a second part rotating relative to the first part and a speed reducer connected between the first part and the second part, wherein the speed reducer comprises a rigid wheel, a flexible wheel and a flexible bearing;

wherein the rigid wheel is configured to enclose a first fitting position, and an inner wheel tooth set facing the first fitting position is disposed on an inner side of the rigid wheel along a radial direction of the rigid wheel;

the flexible wheel comprises a peripheral wall, the peripheral wall encloses a second fitting position, an outer wheel tooth set is disposed on an outer peripheral surface of the peripheral wall, and an inner peripheral surface facing the second fitting position is disposed on the inner side of the flexible wheel in a radial direction of the flexible wheel;

the flexible bearing is installed in the second fitting position and abuts against the inner peripheral surface of the peripheral wall, the flexible wheel is installed in the first fitting position, and the outer wheel tooth set is engaged with the inner wheel tooth set;

along an axial direction of the rigid wheel, a length of a tooth top of the outer wheel tooth set is a first length, a length of a tooth root of the outer wheel tooth set is a second length, a length of a tooth top of the inner wheel tooth set is a third length, and a length of the flexible bearing is a fourth length;

both the second length and the third length are greater than the first length, the second length is greater than the third length, and the fourth length is greater than the second length; and along an axial direction of the flexible wheel, the outer wheel tooth set is disposed at a first end of the peripheral wall, and an inner diameter of the peripheral wall gradually decreases from a middle part of the peripheral wall to a second end of the peripheral wall.

12. The robot according to claim 11, wherein along the axial direction of the rigid wheel, a length of the peripheral wall is a fifth length; and the fourth length is greater than 0.3 times the fifth length and less than 0.7 times the fifth length.

13. The robot according to claim 11, wherein on a radial section of the rigid wheel, the inner peripheral surface is parallel to an axis of the rigid wheel.

14. The robot according to claim 11, wherein along the radial direction of the rigid wheel, a first end surface of the flexible bearing is located on a first plane, a second end surface of the flexible bearing is located on a second plane, and the outer wheel tooth set is located between the first plane and the second plane.

* * * * *